(12) United States Patent
Holzherr

(10) Patent No.: US 10,333,330 B2
(45) Date of Patent: Jun. 25, 2019

(54) ELECTRICALLY HEATED AEROSOL-GENERATING SYSTEM

(71) Applicant: Philip Morris Products S.A., Neuchatel (CH)

(72) Inventor: Raphael Holzherr, Fontaines (CH)

(73) Assignee: PHILIP MORRIS PRODUCTS S.A., Neuchatel (CH)

( * ) Notice: Subject to any disclaimer, the term of this patent is extended or adjusted under 35 U.S.C. 154(b) by 50 days.

(21) Appl. No.: 15/303,439

(22) PCT Filed: Apr. 24, 2015

(86) PCT No.: PCT/EP2015/058909
§ 371 (c)(1),
(2) Date: Oct. 11, 2016

(87) PCT Pub. No.: WO2015/165813
PCT Pub. Date: Nov. 5, 2015

(65) Prior Publication Data
US 2017/0033568 A1 Feb. 2, 2017

(30) Foreign Application Priority Data

Apr. 30, 2014 (EP) .................................... 14166694

(51) Int. Cl.
*H02J 7/00* (2006.01)
*H02J 7/14* (2006.01)
(Continued)

(52) U.S. Cl.
CPC ............ *H02J 7/007* (2013.01); *A24F 47/008* (2013.01); *H02J 7/0008* (2013.01); *H02J 7/0047* (2013.01);
(Continued)

(58) Field of Classification Search
USPC .......... 320/134, 135, 137; 30/132, 134, 150, 30/151, 152, 153, 154
See application file for complete search history.

(56) References Cited

U.S. PATENT DOCUMENTS

| 4,291,838 A | 9/1981 | Williams |
| 5,934,289 A | 8/1999 | Watkins et al. |
| (Continued) | | |

FOREIGN PATENT DOCUMENTS

| CN | 1805239 A | 7/2006 |
| CN | 203166473 U | 8/2013 |
| (Continued) | | |

OTHER PUBLICATIONS

Notice of Allowance dated Oct. 8, 2018 and dated Oct. 17, 2018 in corresponding Singaporean Patent Application No. 11201605888Q, 5 pages.

(Continued)

*Primary Examiner* — Alexis B Pacheco
(74) *Attorney, Agent, or Firm* — Oblon, McClelland, Maier & Neustadt, L.L.P.

(57) ABSTRACT

A method of controlling an electrically heated aerosol-generating system is provided, the system including a charging device including a first rechargeable power supply, and an electrically heated aerosol-generating device configured to receive an aerosol-generating substrate and including a second rechargeable power supply, and at least one electrical heating element; and the method including monitoring an ambient temperature adjacent the charging device, determining a charging current, for charging the rechargeable power supply of the charging device, in dependence on the ambient temperature, and charging the rechargeable power (Continued)

supply of the charging device at the determined charging current. There is also provided a system and device for performing the method.

15 Claims, 6 Drawing Sheets

(51) Int. Cl.
*A24F 47/00* (2006.01)
*H05B 1/02* (2006.01)

(52) U.S. Cl.
CPC .......... *H02J 7/0088* (2013.01); *H05B 1/0244* (2013.01); *H02J 7/0004* (2013.01); *H02J 7/0091* (2013.01); *H05B 2203/021* (2013.01)

(56) References Cited

U.S. PATENT DOCUMENTS

| | | | | |
|---|---|---|---|---|
| 6,188,202 | B1* | 2/2001 | Yagi | H02J 7/0081 320/125 |
| 7,166,987 | B2 | 1/2007 | Lee et al. | |
| 7,187,156 | B2 | 3/2007 | Nakasho et al. | |
| 2009/0230117 | A1* | 9/2009 | Fernando | A24F 47/008 219/490 |
| 2009/0251108 | A1 | 10/2009 | Chao et al. | |
| 2009/0283103 | A1* | 11/2009 | Nielsen | A24F 1/30 131/273 |
| 2010/0236546 | A1 | 9/2010 | Yamada et al. | |
| 2010/0256936 | A1* | 10/2010 | Darilek | G01R 31/3606 702/63 |
| 2011/0148342 | A1 | 6/2011 | Wahlqvist et al. | |
| 2012/0025773 | A1* | 2/2012 | Wang | H02J 7/045 320/129 |
| 2012/0056587 | A1* | 3/2012 | Iida | H01M 10/441 320/118 |
| 2013/0293186 | A1 | 11/2013 | Chou et al. | |
| 2013/0336358 | A1 | 12/2013 | Liu | |
| 2014/0014125 | A1* | 1/2014 | Fernando | A24F 47/008 131/328 |
| 2014/0283856 | A1 | 9/2014 | Xiang | |
| 2014/0345633 | A1* | 11/2014 | Talon | A24F 47/008 131/329 |
| 2014/0348495 | A1* | 11/2014 | Greim | H05B 3/02 392/386 |
| 2015/0108950 | A1* | 4/2015 | Yun | H02J 7/0068 320/134 |
| 2015/0189916 | A1* | 7/2015 | Wu | A24F 47/008 219/510 |
| 2016/0278431 | A1* | 9/2016 | Liu | G06K 9/325 |

FOREIGN PATENT DOCUMENTS

| | | |
|---|---|---|
| CN | 103281920 A | 9/2013 |
| CN | 103384071 A | 11/2013 |
| EP | 2 100 525 A1 | 9/2009 |
| JP | 4-340330 | 11/1992 |
| JP | 2007-6628 | 1/2007 |
| RU | 2010 141 985 A | 4/2012 |
| WO | WO 98/17130 A1 | 4/1998 |
| WO | WO 2013/10261 A2 | 7/2013 |
| WO | WO 2013/098398 A2 | 7/2013 |
| WO | WO 2013/102612 A2 | 7/2013 |
| WO | WO 2014/029880 A2 | 2/2014 |
| WO | WO 2014/047953 A1 | 4/2014 |
| WO | WO 2014/060267 A2 | 4/2014 |

OTHER PUBLICATIONS

Notice of Allowance dated Sep. 26, 2018 in corresponding Russian Patent Application No. 2016146694/12(074917), 22 pages.
Combined Chinese Office Action and Search Report dated Nov. 23, 2018 in corresponding Chinese Patent Application No. 201580013587.2 (with English Translation), citing documents AO-AQ therein, 21 pages.
Japanese Office Action with English translation dated Jan. 24, 2019 in corresponding Japanese Patent Application No. 2016-556311, citing documents AO-AQ therein (16 pages).
International Search Report and Written Opinion of the International Searching Authority dated May 19, 2015, in PCT/EP2015/058909 filed Apr. 24, 2015.

* cited by examiner

ELECTRICALLY HEATED AEROSOL-GENERATING SYSTEM

The present invention relates to a method of controlling an electrically heated aerosol-generating system, a method of controlling an electrically heated aerosol-generating device, and the associated electrically heated aerosol-generating system and device.

An example of such an electrical system having a portable device and a primary charging device is an electrically operated smoking system. Electrically operated smoking systems significantly reduce sidestream smoke, as compared to lit-end smoking devices, while permitting a consumer to selectively activate the smoking system during the smoking experience. Electrically operated smoking systems typically include an aerosol-generating device having a housing for receiving an aerosol-generating article or a smoking article, heating elements to generate an aerosol, a power source and the necessary electronic circuitry. The circuitry may be, for example, circuitry for controlling the heating and charging of the aerosol-generating device. Having a portable device and primary charging device provides the advantage of a small aerosol-generating device being the portable device that is easy to hold and use, but also the ability to quickly and conveniently recharge the aerosol generating device for repeated use.

Despite such known systems, there still remains the need to enable improve the speed and efficiency of the power supply charging process. That is, the charging of the charging device power supply and the charging of the aerosol-generating device power supply.

According to an aspect of the present invention, there is provided a method of controlling an electrically heated aerosol-generating system. The electrically heated aerosol-generating system comprises a charging device comprising a rechargeable power supply, and an electrically heated aerosol-generating device configured to receive an aerosol-generating substrate comprising a rechargeable power supply, and at least one electrical heating element. The method comprises: monitoring the ambient temperature adjacent the charging device; determining a charging current, for charging the rechargeable power supply of the charging device, in dependence on the ambient temperature adjacent the charging device; and charging the rechargeable power supply of the charging device at the determined charging current. Such that when the ambient temperature adjacent the charging device is within a first pre-determined temperature range, the charging current is less than about 0.1 C; when the ambient temperature adjacent the charging device is within a second pre-determined temperature range, the charging current is greater than about 0.1 C; and, when the ambient temperature adjacent the charging device is above a pre-determined temperature, preventing charging of the rechargeable power of the charging device.

Providing such a charging method enables the rechargeable power supply of the charging device to be recharged at a substantially optimum rate while reducing the risk of damaging the rechargeable power supply due to supplying a charging current that is too large for the current status of the power supply.

As used herein, the term "C" refers to a charging current, where 1 C equates to 1 A for a 1000 mAh rechargeable power supply. That is to say, the charging current at which the capacity of the rechargeable power supply is supplied in one hour.

In one embodiment, the first temperature range is between about 0 degrees C. and about 10 degrees C., and the second temperature range is between about 10 degrees C. and about 45 degrees C.

In a preferred embodiment, when the ambient temperature adjacent the charging device is within the second pre-determined temperature range, the charging current is about 0.2 C.

The rechargeable power supply of the charging device may be configured to allow fast charging of the power supply. In this embodiment, when the ambient temperature adjacent the charging device is within the second pre-determined temperature range, the fast charging current is about 1 C. The method may comprise receiving an input from the user requesting that the charging device power supply is fast charged. In addition, or alternatively, the method may comprise determining the type of input power supply providing the power to recharge the charging device power supply, and determining the charging current accordingly. For example, if the input power supply cannot provide sufficient power to fast charge the rechargeable power supply, a charging current of 0.2 C is selected.

Given the above, it will be appreciated that the first and second temperature ranges, and the associated charging currents, may be altered by one of ordinary skill in the art in dependence on the type of power supply used.

The method may further comprise, when the rechargeable power supply of the charging device is being charged, indicating to a user which charging current is being provided to the power supply. The step of indicating which charging current is being provided preferably utilises at least one of: a visual indicator, such as a light, or series of lights; a sound, or series of sounds; and a tactile indicator. The tactile indicator may be a vibration or series of vibrations. The visual indicator may be a digital display. The digital display may provide an estimate of the time required to fully charge the charging device rechargeable power supply.

The method preferably further comprises the steps of: determining a discharging current for the rechargeable power supply of the charging device, for charging the rechargeable power supply of the electrically heated aerosol-generating device; and charging the rechargeable power supply of the electrically heated aerosol-generating device at the determined discharge current. Such that when the ambient temperature adjacent the charging device is within a third pre-determined temperature range, the discharging current is between about 0.1 C and about 0.3 C; when the ambient temperature adjacent the charging device is within a fourth pre-determined temperature range, the discharging current is between about 0.8 C and about 1.2 C; and when the ambient temperature adjacent the charging device is above a pre-determined temperature, preventing discharging of the rechargeable power of the charging device.

Providing such a charging method enables the rechargeable power supply of the electrically heated aerosol-generating device to be recharged at a substantially optimum rate while reducing the risk of damaging the rechargeable power supply of the charging device due to providing a charging current that is too large for the current status of the power supply. As will be appreciated, the discharging current of the charging device power supply is substantially equivalent to the charging current of the electrically heated aerosol-generating device power supply.

In one embodiment, the third temperature range is between about −10 degrees C. and about 0 degrees C., and the fourth temperature range is between about 0 degrees C. and about 45 degrees C.

In a preferred embodiment, when the ambient temperature adjacent the charging device is within a third pre-determined temperature range, the discharging current is about 0.2 C, and when the ambient temperature adjacent the charging device is within a fourth pre-determined temperature range, the discharging current is about 1 C.

The method may further comprise, when the rechargeable power supply of the charging device is being discharged, indicating to a user which discharging current is being provided to the power supply of the electrically heated aerosol-generating device. The step of indicating which discharging current is being provided preferably utilises at least one of: a visual indicator, such as a light, or series of lights; a sound, or series of sounds; and a tactile indicator. The tactile indicator may be a vibration or series of vibrations. The visual indicator may be an electronic display. The electronic display may provide an estimate of the time required to fully charge the electrically heated aerosol-generating device rechargeable power supply.

The method preferably further comprises monitoring the ambient temperature adjacent the electrically heated aerosol-generating device, and providing a charging current to the rechargeable power supply of the electrically heated aerosol-generating device for recharging the power supply, in dependence on the ambient temperature adjacent the device. Such that when the ambient temperature adjacent the electrically heated aerosol-generating device is within a pre-determined temperature range, providing a charging current of about 10 C to the power supply; and when the ambient temperature adjacent the electrically heated aerosol-generating device is without the pre-determined temperature range, preventing a charging current from being supplied to the power supply.

In a preferred embodiment, the charging current of about 10 C is provided to the power supply when the pre-determined temperature range is about 0 degrees C. to about 35 degrees C.

In one embodiment, the step of monitoring the ambient temperature is preferably performed with a frequency of about once per minute to about 5 time per minute. Preferably, the ambient temperature is monitored once per minute. In this embodiment, the step of determining a charging current is performed in dependence on an average of the monitored ambient temperature, preferably a weighted average. The average may be calculated using two, three, four or more measurements. Where used, the weighting applied to each successive measurement may decrease in an arithmetical progression, or in a geometric progression.

In a preferred embodiment, a weighted average is used, where the weighted average is calculated using the present measured ambient temperature and the previous weighted average. The present measurement is given a weight of between about 10% and about 50%, and the previous weighted average is given a weight of between about 90% and about 50% accordingly. The weightings applied are preferably chosen in dependence on the overall heat transfer coefficient of the rechargeable power supply and surrounding air, such that the weighting produces an approximation to the heating rate or cooling rate of the rechargeable power supply. The initial weighted average is set to the first measurement of ambient temperature.

In one example, the present measurement is given a weight of about 20%, and the previous weighted average is given a weight of about 80%. Advantageously, such weightings approximate the relatively slow heating rate or cooling rate of the rechargeable power supplies of the systems described herein.

According to a further aspect of the present invention, there is provided a method of controlling an electrically heated aerosol-generating device configured to receive an aerosol-generating substrate. The device comprises a rechargeable power supply, and at least one electrical heating element. The method of the further aspect comprises: monitoring the ambient temperature adjacent the device; and providing power to the heating element from the rechargeable power supply in dependence on the ambient temperature adjacent the device. Such that: when the ambient temperature adjacent the device is within a pre-determined temperature range, providing power to the heating element; and when the ambient temperature adjacent the device is without the pre-determined temperature range, preventing power being supplied to the heating element.

In one embodiment, the operational temperature range is between about 10 degrees C. and about 70 degrees C., more preferably between about 12 degrees C. and about 65 degrees C. When the temperature is below the lower end of the operational temperature range the resistance of the heating element is low as compared to the resistance of the heating element when the temperature is within the operational range. Thus, in accordance with Ohm's law, the current drain is higher and, without increasing the size and capacity, the power supply of the electrically heated aerosol-generating device cannot provide the required current.

Again, the step of monitoring the ambient temperature adjacent the aerosol-generating device is preferably performed with a frequency of about once per minute to about 5 time per minute. Preferably, a similar weighted average process is used as described above. The present measurement is given a weight of between about 10% and about 50%, and the previous weighted average is given a weight of between about 90% and about 50% accordingly. The weightings applied are preferably chosen in dependence on the overall heat transfer coefficient of the rechargeable power supply and surrounding air, such that the weighting produces an approximation to the heating rate or cooling rate of the rechargeable power supply. Again, the initial weighted average is set to the first measurement of ambient temperature.

In one example, the present measurement is given a weight of about 30%, and the previous weighted average is given a weight of about 70%. Advantageously, these weightings model the heating and cooling rate of the aerosol-generating device more effectively than the above described 20%/80% model used for the charging device weighted average because the thermal mass of the aerosol-generating device is less than the thermal mass of the charging device. Therefore, the aerosol-generating device heats or cools more quickly than the charging device.

According to a further aspect of the present invention, there is provided an electrically heated aerosol-generating system. The system comprises: an electrically heated aerosol-generating device configured to receive an aerosol-generating substrate. The device comprises: a heating element; a rechargeable power supply for powering the heating element. The system further comprises a charging device configured to receive the electrically heated aerosol-generating device. The charging device comprises: a cavity for receiving the electrically heated aerosol-generating device; a rechargeable power supply for charging the rechargeable power supply of the electrically heated aerosol-generating device; a temperature sensor for sensing the ambient temperature adjacent the charging device; and a controller for controlling the supply of power to the charging device power supply from an external power source to recharge the power supply, in dependence on the ambient temperature adjacent the charging device. Such that: when the ambient temperature adjacent the charging device is within a first pre-determined range, the controller is configured to provide a charging current of less than about 0.1 C; when the ambient temperature adjacent the charging device is within a second pre-determined range, the controller is configured to provide a charging current of greater than about 0.1 C; and when the ambient temperature adjacent the charging device is above a pre-determined temperature, preventing charging of the rechargeable power of the charging device.

Providing such a system enables the rechargeable power supply of the charging device to be recharged at a substantially optimum rate while reducing the risk of damaging the rechargeable power supply due to supplying a charging current that is too large for the current status of the power supply.

In one embodiment, the first temperature range is between about 0 degrees C. and about 10 degrees C., and the second temperature range is between about 10 degrees C. and about 45 degrees C.

In a preferred embodiment, when the ambient temperature adjacent the charging device is within the second pre-determined temperature range, the charging current is about 0.2 C.

The rechargeable power supply of the charging device may be configured to allow fast charging of the power supply. In this embodiment, when the ambient temperature adjacent the charging device is within the second pre-determined temperature range, the fast charging current is about 1 C. The controller may be configured to receive an input from the user requesting that the charging device power supply is fast charged. In addition, or alternatively, the controller may be configured to determine the type of input power supply providing the power to recharge the charging device power supply, and determine the charging current accordingly. For example, if the input power supply cannot provide sufficient power to fast charge the rechargeable power supply, a charging current of 0.2 C is selected.

Preferably, the charging device comprises means for receiving external electrical power to recharge the rechargeable power supply.

The charging device may further comprise an indicator for indicating to a user which charging current is being provided to the power supply, when the rechargeable power supply of the charging device is being charged. The indicator preferably comprises at least one of: a visual indicator, such as a light, or series of lights; a sound, or series of sounds; and a tactile indicator. The tactile indicator may be a vibration, or series of vibrations. The visual indicator may be a digital display. The digital display may provide an estimate of the time required to fully charge the charging device rechargeable power supply.

Preferably, the charging device controller is further configured to control the supply of power from the charging device power supply to the electrically heated aerosol-generating device power supply to recharge the power supply. Such that: when the ambient temperature adjacent the charging device is within a third pre-determined temperature range, the controller is configured to provide a discharging current between about 0.1 C and about 0.3 C to the power supply of the electrically heated aerosol-generating device; when the ambient temperature adjacent the charging device is within a fourth pre-determined temperature range, the controller is configured to provide a discharging current between about 0.8 C and about 1.2 C to the power supply of the electrically heated aerosol-generating device; and when the ambient temperature adjacent the charging device is above a pre-determined temperature, the controller is configured to prevent discharging of the rechargeable power of the charging device.

Providing such a controller enables the rechargeable power supply of the electrically heated aerosol-generating device to be recharged at a substantially optimum rate while reducing the risk of damaging the rechargeable power supply of the charging device due to providing a charging current that is too large for the current status of the power supply. As will be appreciated, the discharging current of the charging device power supply is substantially equivalent to the charging current of the electrically heated aerosol-generating device power supply.

In one embodiment, the third temperature range is between about −10 degrees C. and about 0 degrees C., and the fourth temperature range is between about 0 degrees C. and about 45 degrees C.

In a preferred embodiment, when the ambient temperature adjacent the charging device is within a third pre-determined temperature range, the discharging current is about 0.2 C, and when the ambient temperature adjacent the charging device is within a fourth pre-determined temperature range, the discharging current is about 1 C.

Preferably, the charging device power supply is a lithium-ion battery. More preferably, the charging device power supply is a lithium cobalt oxide battery.

Preferably, the electrically heated aerosol-generating device power supply is also a lithium-ion battery. More preferably, the electrically heated aerosol-generating device power supply is a lithium iron phosphate battery.

The charging device may further comprise an indicator for indicating to a user which discharging current is being provided to the power supply of the electrically heated aerosol-generating device when the rechargeable power supply of the charging device is being discharged. The indicator preferably comprises at least one of: a visual indicator, such as a light, or series of lights; a sound, or series of sounds; and a tactile indicator. The tactile indicator may be a vibration or series of vibrations. The visual indicator may be an electronic display. The electronic display may provide an estimate of the time required to fully charge the electrically heated aerosol-generating device rechargeable power supply.

The charging device may include a display, or further display, (for example a digital display) indicating information to the user. For example, the display may indicate smoking article consumption, energy usage or other information. The display may further indicate when the electrically heated aerosol-generating device power supply has sufficient charge to be used to consume a smoking article.

Preferably, the charging device further comprises a housing, and a lid attached to the housing. The lid is configured to close over the open end of the cavity, such that the electrically heated aerosol-generating device is not accessible when the lid is in the closed position. The charging device may further comprise means for preventing the supply of power to the electrically heated aerosol-generating device when the lid is open.

The lid is preferably a hinge lid. Preferably, the hinge extends across the top of the housing from the front wall to the back wall. The hinge may comprise a spring configured to retain the lid in the first position. The hinge may also comprise a damper configured to damp the motion of the lid when the lid is moved from the second position to the first position. Alternatively, the hinge may comprise a spring configured to retain the lid in the second position. In this alternative, the lid is preferably provided with means for retaining the lid in the first position, the retaining means being configured to provide sufficient force to overcome the force applied to the lid by the spring.

The retaining means may comprise at least one magnet and at least one corresponding ferrous element. The at least one magnet being provided in the housing of the primary device, and the ferrous element being provided in the lid. Alternatively, the retaining means may be a latch type arrangement.

The hinge lid may form the entire top of the housing. In this alternative, the hinge may be internal to the lid, and be adjacent a side wall of the housing.

The housing of the charging device preferably comprises a front wall, a back wall, a bottom wall, a top wall, a first side wall and a second side wall.

The terms "front", "back", "upper, "lower", "side", "top", "bottom", "left", "right" and other terms used to describe relative positions of the components of the charging device and electrically heated aerosol-generating device refer to the charging device in an upright position with the opening of the cavity configured to receive the electrically heated aerosol-generating device at the top end.

The term "longitudinal" refers to a direction from bottom to top or vice versa. The term "transverse" refers to a direction perpendicular to the longitudinal direction.

The charging device may be a substantially rectangular parallelepiped comprising two wider walls spaced apart by two narrower side walls and top and bottom walls. The electrically heated aerosol-generating device is preferably elongate.

The temperature sensor is preferably provided in contact with a wall of the charging device housing to enable an improved correlation between the measured temperature and the ambient temperature. The temperature sensor may be a thermocouple or a thermistor.

The electrically heated aerosol-generating device of the system preferably further comprises a temperature sensor for sensing the ambient temperature adjacent the device. The charging device controller is preferably further configured to control the supply of power from the charging device power supply to the electrically heated aerosol-generating device power supply to recharge the power supply in dependence on the ambient temperature adjacent the electrically heated aerosol-generating device. Such that: when the ambient temperature adjacent the electrically heated aerosol-generating device is within a pre-determined temperature range, the controller is configured to provide a charging current of about 10 C to the power supply; and when the ambient temperature adjacent the electrically heated aerosol-generating device is without the pre-determined temperature range, the controller is configured to prevent a charging current from being supplied to the power supply.

In a preferred embodiment, the charging current of about 10 C is provided to the power supply when the pre-determined temperature range is about 0 degrees C. to about 35 degrees C.

The temperature sensor of the electrically heated aerosol-generating device is preferably provided in contact with a wall of a housing of the device to enable an improved correlation between the measured temperature and the ambient temperature. The temperature sensor may be a thermocouple or a thermistor. Alternatively, the heating element may be used as a thermistor to measure the temperature.

According to a yet further aspect of the present invention, there is provided an electrically heated aerosol-generating device configured to receive an aerosol-generating substrate. The device comprises: a heating element; a rechargeable power supply for powering the heating element; a temperature sensor for sensing the ambient temperature adjacent the device; and a controller for controlling supply of power from the power supply to the heating element in dependence on the ambient temperature adjacent the device. Such that: when the ambient temperature adjacent the device is within a pre-determined temperature range, the controller is configured to provide power to the heating element; and when the ambient temperature adjacent the device is without the pre-determined temperature range, the controller is configured to prevent power being supplied to the heating element.

The device may further comprise an indicator for indicating to a user when the ambient temperature adjacent the device is without the pre-determined temperature range.

Preferably, the aerosol-generating device is designed to receive an aerosol-generating substrate in the form of an aerosol-generating article, and be held by a user during a smoking experience. The aerosol-generating device power supply is preferably adapted to heat up the aerosol-forming substrate to operating temperature before aerosol generating begins. The power supply in the aerosol-generating device is also adapted to maintain the temperature of the aerosol-forming substrate during the aerosol generation.

The aerosol-generating device is preferably of a similar size to or slightly larger than a lit-end cigarette. Thus, the device can be held between the user's fingers in a similar way to a lit-end cigarette.

The aerosol-generating substrate is preferably in the form of an aerosol-generating article, or a smoking article.

As used herein, the term 'aerosol-forming substrate' relates to a substrate capable of releasing volatile compounds that can form an aerosol. Such volatile compounds are released by heating the aerosol-forming substrate. An aerosol-forming substrate may be solid or liquid or comprise both solid and liquid components. An aerosol-forming substrate may be adsorbed, coated, impregnated or otherwise loaded onto a carrier or support. An aerosol-forming substrate may conveniently be part of an aerosol-generating article or smoking article.

An aerosol-forming substrate may comprise nicotine. An aerosol-forming substrate may comprise tobacco, for example may comprise a tobacco-containing material containing volatile tobacco flavour compounds, which are released from the aerosol-forming substrate upon heating. In preferred embodiments an aerosol-forming substrate may comprise homogenised tobacco material, for example cast leaf tobacco. An aerosol-forming substrate may comprise at least one aerosol-former, such as propylene glycol or glycerine.

As used herein, the terms 'aerosol-generating article' and 'smoking article' refer to an article comprising an aerosol-forming substrate that is capable of releasing volatile compounds that can form an aerosol. For example, an aerosol-generating article may be a smoking article that generates an aerosol that is directly inhalable into a user's lungs through the user's mouth. An aerosol-generating article may be disposable. The term 'aerosol-generating article' is generally used hereafter.

The aerosol formed by heating the aerosol-forming substrate may contain fewer known harmful constituents than would be produced by combustion or pyrolytic degradation of the aerosol-forming substrate. An aerosol-generating article may be, or may comprise, a tobacco stick.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. Optionally, the solid substrate may contain additional tobacco or non-tobacco volatile flavour compounds, to be released upon heating of the substrate. Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix. The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavour delivery during use. Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

The aerosol-forming substrate may be a liquid substrate and the smoking article may comprise means for retaining the liquid substrate. The aerosol-forming substrate may alternatively be any other sort of substrate, for example, a gas substrate, or any combination of the various types of substrate.

Any feature in one aspect of the invention may be applied to other aspects of the invention, in any appropriate combination. In particular, method aspects may be applied to apparatus aspects, and vice versa. More specifically, the controllers described herein in relation to the charging device and the electrically heated aerosol-generating device may be configured to carry out any method aspects in relation to the control of the power supplies. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention will be further described, by way of example only, with reference to the accompanying drawings in which.

Figure 1A:
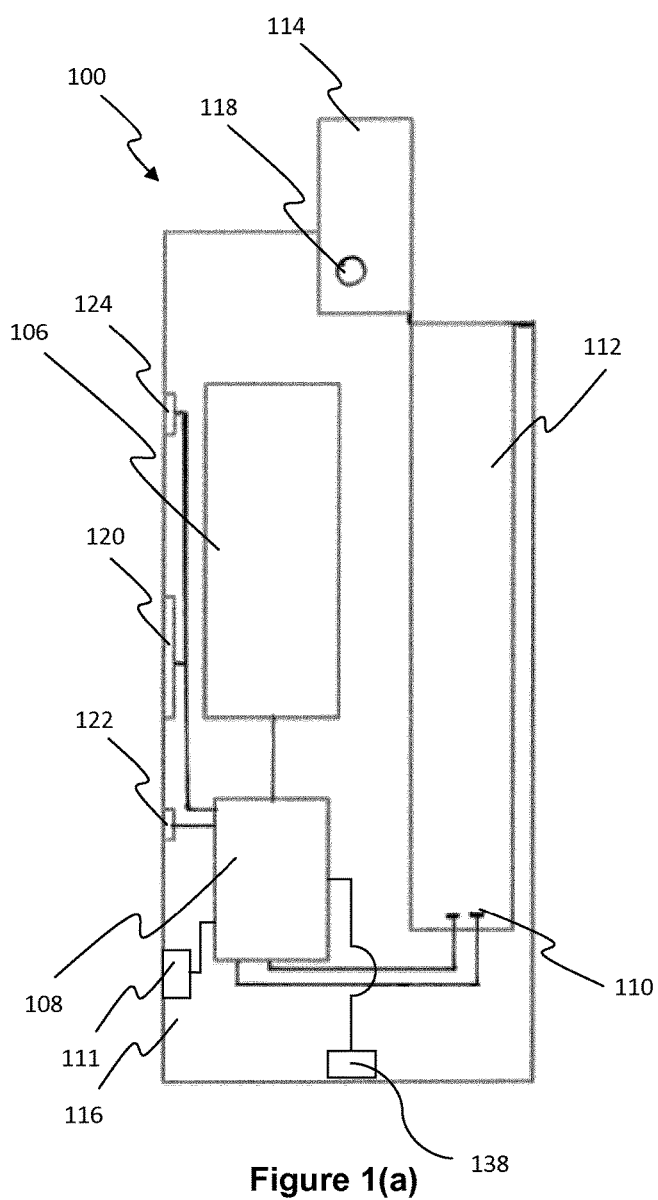
FIG. 1 show schematic diagrams of a charging unit and electrically heated aerosol-generating device according to the invention.
Figure 1B:
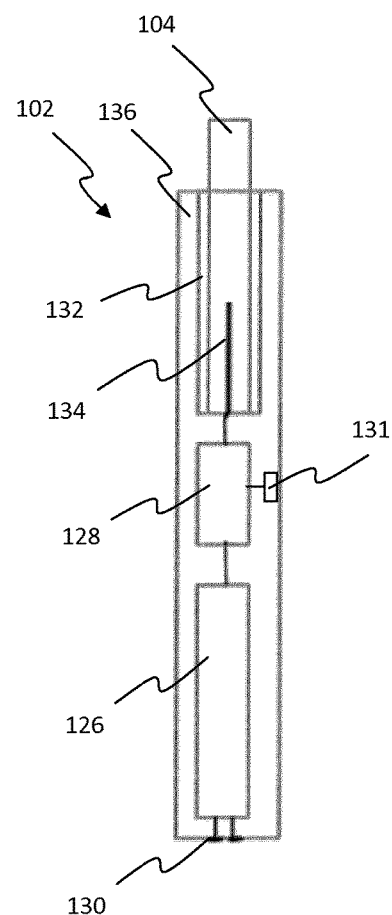

FIG. 1(*a*) shows a charging device 100. The charging device 100 in this example is for an electrically heated smoking system. FIG. 1(*b*) shows an electrically heated aerosol-generating device 102. The electrically heated aerosol-generating device 102 is adapted to receive a smoking article 104 comprising an aerosol-forming substrate. The charging device 100 comprises a rechargeable battery 106, control electronics 108, and electrical contacts 110 configured to provide electrical power to the aerosol-generating device, from the battery 106, when the aerosol-generating device is in connection with the electrical contacts 110. The charging device further comprises a temperature sensor 111. The rechargeable battery 106 is a lithium cobalt oxide battery.

The charging device is configured to charge the aerosol-generating device utilising the battery 106, in dependence on the measured temperature. The electrical contacts 110 are provided adjacent the bottom of a cavity 112. The cavity is configured to receive the aerosol-generating device 102. A lid 114 is provided that is configured to secure the aerosol-generating device 102 within the cavity 112 of the charging device 100. The components of the charging device 100 are housed within the housing 116. The lid 114 is coupled to the housing 116 by hinge 118.

In addition, the charging device 100 is provided with a series of three indicators 120, 122 and 124. The indicator 120 is provided to indicate the level of charge remaining in the charging device battery 106. The indicator 120 may indicate the percentage of the charge remaining in the charging device battery. For example, 100% would indicate that the battery 106 is fully charged, and 50% would indicate that the battery 106 is half charged. Alternatively the indicator 120 may simply indicated when the charging device battery requires recharging.

The second indicator 122 is provided to indicate that the aerosol-generating device 102 is fully charged, and ready to be used to generate an aerosol. The indicator 122 only indicates this state of readiness once the aerosol-generating device is capable of providing sufficient power to provide the user with a complete smoking experience; for example, sufficient power to aerosolise the entire aerosol forming substrate 104, or sufficient power to generate a predetermined number of puffs.

The third indicator 124 is provided to indicate the charging regime being used to recharge the battery 106 from the external power supply (not shown). The various charging regimes are described in detail below.

The aerosol-generating device 102 comprises a rechargeable battery 126, control electronics 128 and electrical contacts 130. As described above, the rechargeable battery 126 of the aerosol-generating device 102 is configured to receive a supply of power from the charging device battery 106 when the electrical contacts 130 are in contact with the electrical contacts 110 of the charging device 100. The aerosol-generating device further comprises a temperature sensor 131 for measuring the ambient temperature adjacent the device. The rechargeable battery 126 is a lithium iron phosphate battery.

Figure 2:
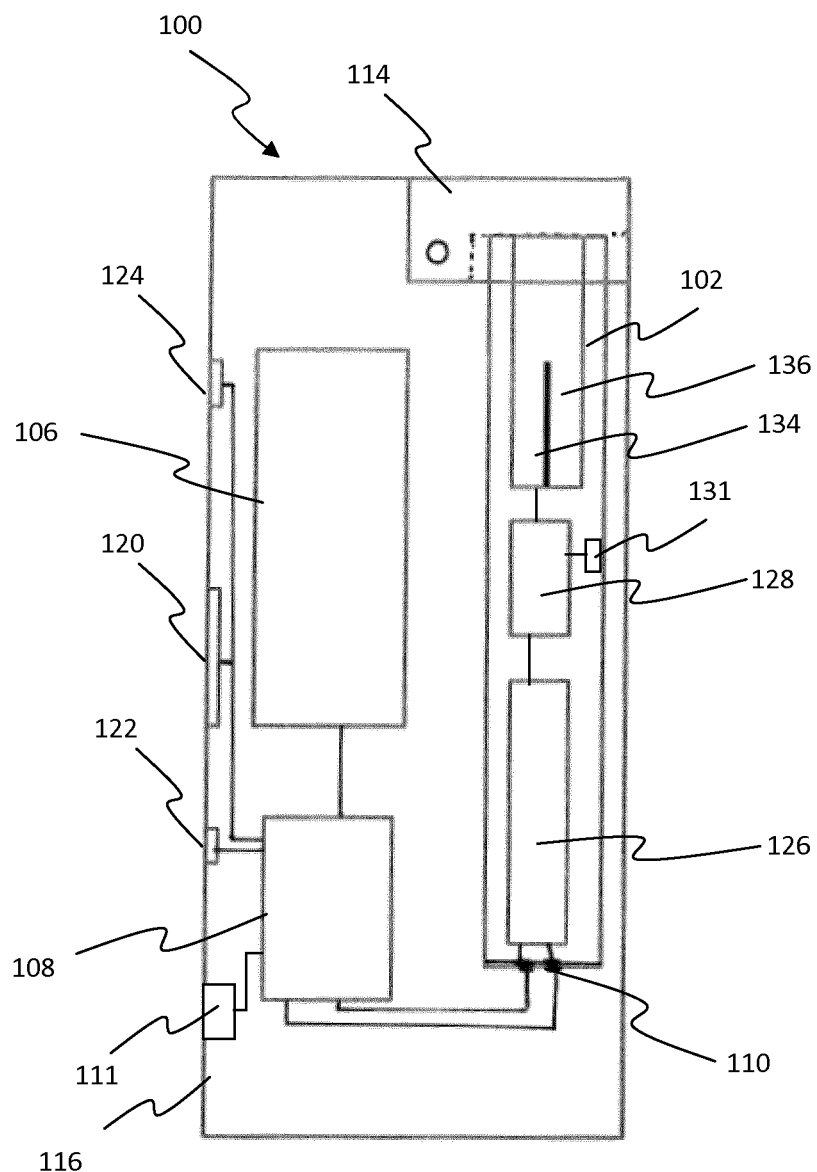
FIG. 2 show a system of the present invention having a charging unit and an electrically heated aerosol-generating device.

The aerosol-generating device 102 further comprises a cavity 132 configured to receive the aerosol-generating article 104. A heater 134, in the form of, for example, a blade heater, is provided at the bottom of the cavity 132. In use, the user activates the aerosol-generating device 102, and power is provided from the battery 126 via the control electronics 128 to the heater 134. The heater is heated to a standard operational temperature that is sufficient to generate an aerosol from the aerosol-forming substrate of the aerosol-generating article 104. The components of the aerosol-generating device 102 are housed within the housing 136. FIG. 2 shows the aerosol-generating device 102 housed within the cavity of the charging device 100. The lid 114 is shown in a closed position. In this closed position the lid is configured to act on the aerosol-generating device 102 such that a good electrical connection is made between the charging device and the aerosol-generating device. As can be seen, the electrical contacts 130 of the aerosol-generating device are engaged with the electrical contacts 110 of the charging device.

The control electronics 108 of the charging device are configured both to control the charging of the charging device battery 106 by the external power supply, and to control the charging of the aerosol-generating device battery 126, in dependence on the ambient temperature. The control methods utilised by the control electronics 108 are described with reference to FIGS. 3 and 4 respectively.

Figure 3:
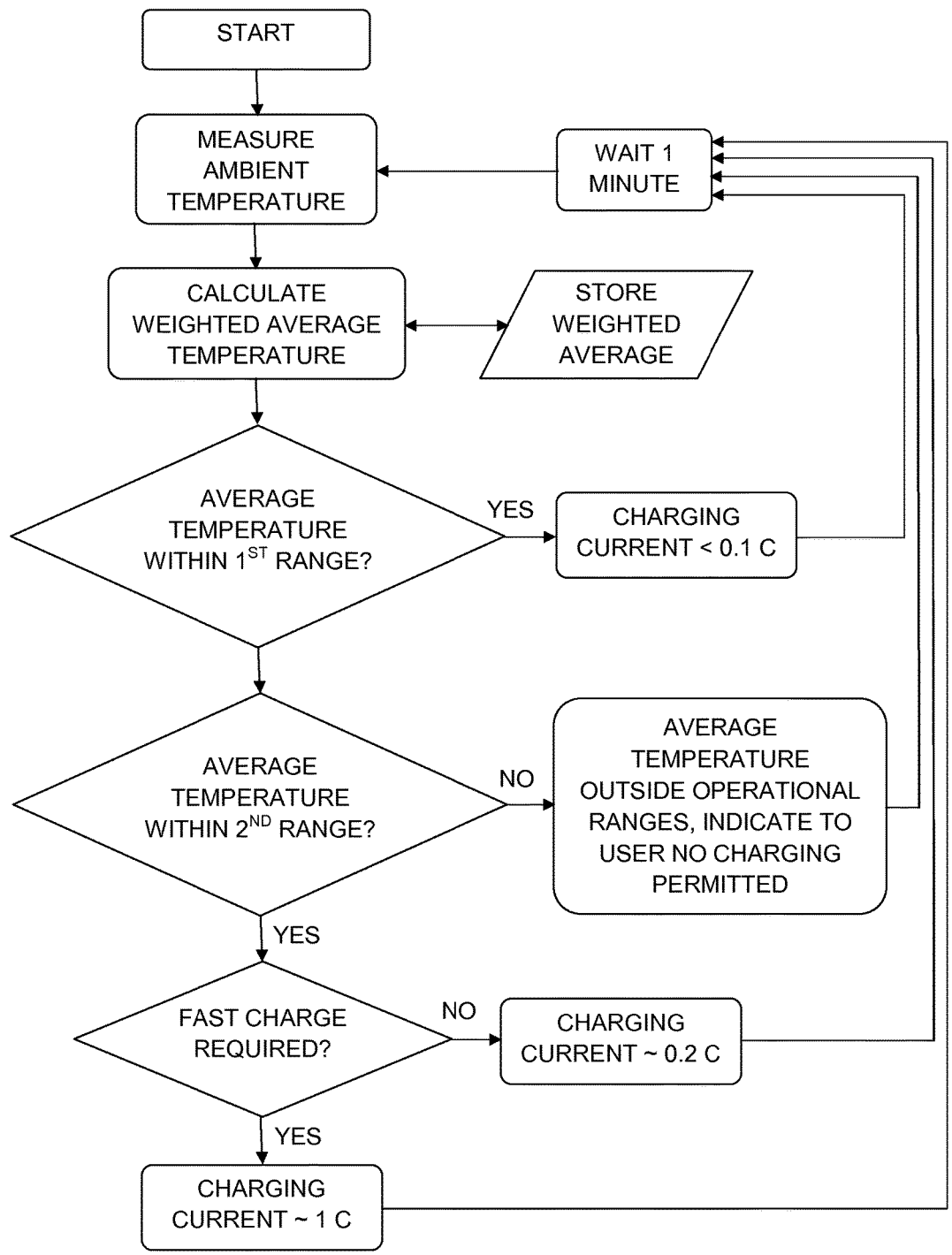
FIG. 3 shows a flow diagram of the control steps for charging the charging unit.

In use, when the user connects the charging device to an external power supply, the control electronics 108 determine the appropriate charging current using the following method shown in FIG. 3.

The ambient temperature adjacent the charging device is measured using temperature sensor 111, and a weighted average of the ambient temperature is calculated. The current temperature measurement is given a weighting of 20%, and the previous weighted average is given a weighting of 80%. Where the temperature measurement is the first temperature measurement, the weighted average is set to the current temperature.

The control electronics 108 then determine whether the weighted average temperature is within a first range of temperatures. In one specific example, the first range of temperature is 0 degrees C. to 10 degrees C. If the weighted average temperature is within the range, the control electronics provides a charging current to the battery 106 of less than 0.1 C.

If the weighted average temperature is not within the range, the control electronics determines whether the weighted average temperature is within a second range of temperatures. In one specific example, the second range of temperatures is 10 degrees C. to 45 degrees C. If the weighted average temperature is not within the second range of temperatures the battery 106 is without the operational temperature range and no charging is initiated to protect the battery from damage. The indicator 124 indicates this to the user.

If the weighted average temperature is within the second temperature range, the control electronics 108 determines whether fast charging is required, if so, a charging current of approximately 1 C is provided, if not a charging current of approximately 0.2 C is provided.

At each stage a charging current is determined, after a period of 1 minute the process is repeated.

Figure 4:
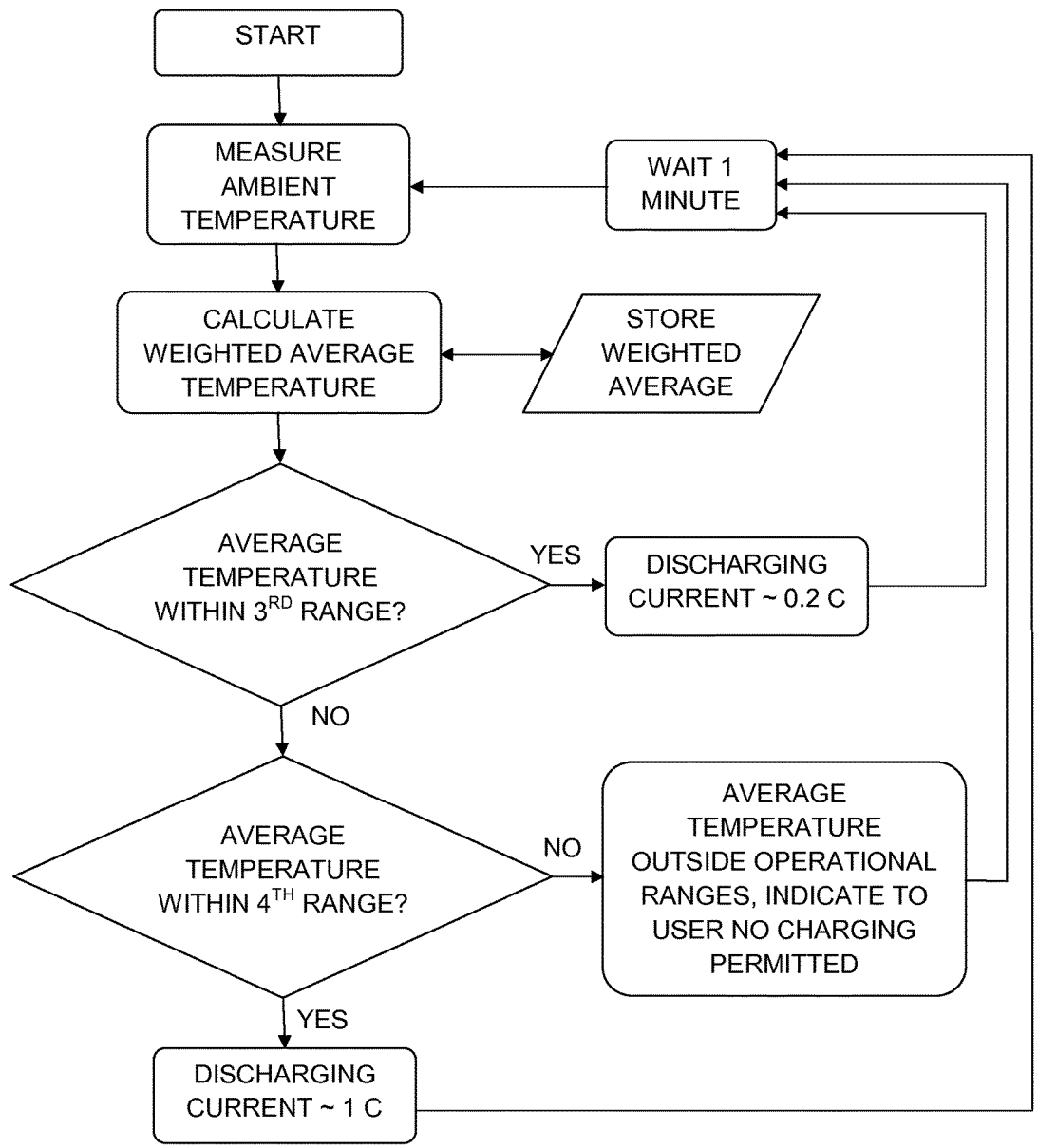
FIG. 4 shows a flow diagram of the control steps for discharging the charging unit.

In use, when the user inserts the aerosol-generating device into the charging device and activates charging of the aerosol-generating device, the control electronics 108 determine the appropriate charging current using the following method shown in FIG. 4.

Again, the ambient temperature adjacent the charging device is measured using temperature sensor 111, and a weighted average of the ambient temperature is calculated. The current temperature measurement is given a weighting of 20%, and the previous weighted average is given a weighting of 80%. Where the temperature measurement is the first temperature measurement, the weighted average is set to the current temperature.

The control electronics 108 then determine whether the weighted average temperature is within a third range of temperatures. In one specific example, the third range of temperatures is −10 degrees C. to 0 degrees C. If the weighted average temperature is within the range, the control electronics provides a charging current to the battery 126 of approximately 0.2 C.

If the weighted average temperature is not within the range, the control electronics determines whether the weighted average temperature is within a fourth range of temperatures. In one specific example, the second range of temperatures is 0 degrees C. to 45 degrees C. If the weighted average temperature is not within the fourth range of temperatures the battery 126 is without the operational temperature range and no charging is initiated to protect the battery from damage. The indicator 124 indicates this to the user.

If the weighted average temperature is within the fourth temperature range, the control electronics 108 provides a charging current of approximately 1 C to the battery 126.

At each stage a charging current is determined, after a period of 1 minute the process is repeated.

Furthermore, the aerosol-generating device control electronics 128 are configured both to control the charging of the device battery 126, and to control the use of the device in dependence on the ambient temperature. The control methods utilised by the control electronics 128 are described with reference to FIGS. 5 and 6.

Figure 5:
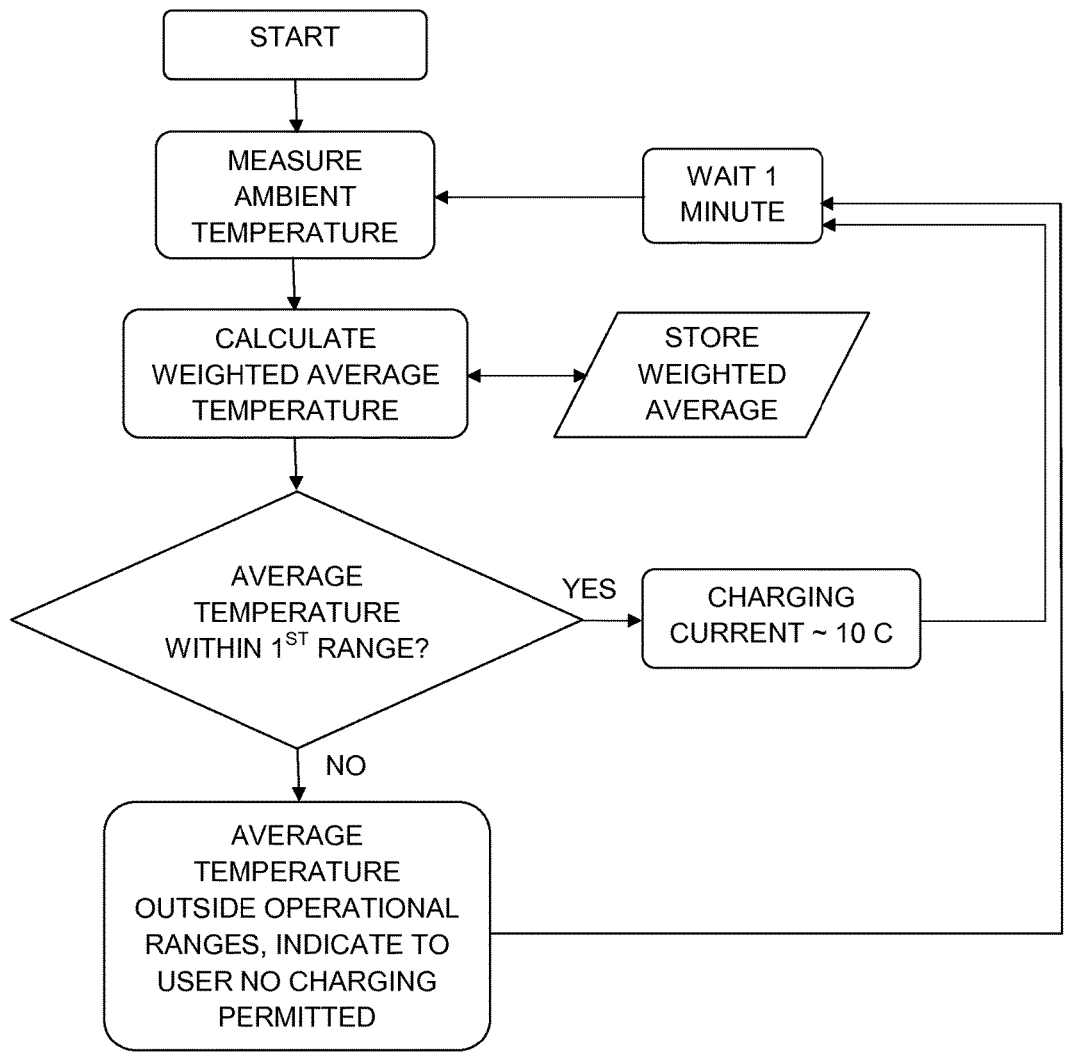
FIG. 5 shows a flow diagram of the control steps for charging the electrically heated aerosol-generating device.

When the user initiates the charging of the aerosol-generating device, the control electronics 128 of the aerosol-generating device are configured to carry out the method shown in FIG. 5 to determine whether the battery 126 may be charged.

The ambient temperature adjacent the device 102 is measured using temperature sensor 131, and a weighted average of the ambient temperature is calculated. The current temperature measurement is given a weighting of between 10-50%, and the previous weighted average is given a weighting of 90-50%. Where the temperature measurement is the first temperature measurement, the weighted average is set to the current temperature.

The control electronics 128 then determine whether the weighted average temperature is within a range of operational temperatures. In one specific example, the operational range of temperatures is 0 degrees C. to 35 degrees C. If the weighted average temperature is within the range, the control electronics enables a charging current of approximately 10 C to be provided to the battery 126. However, the charging device temperature may change this charging rate in accordance with the control method described above.

If the weighted average temperature is not within the range, the control electronics prevents the battery 126 from being charged to reduce the risk of damaging the battery.

At each stage a charging current is determined, after a period of 1 minute the process is repeated.

Figure 6:
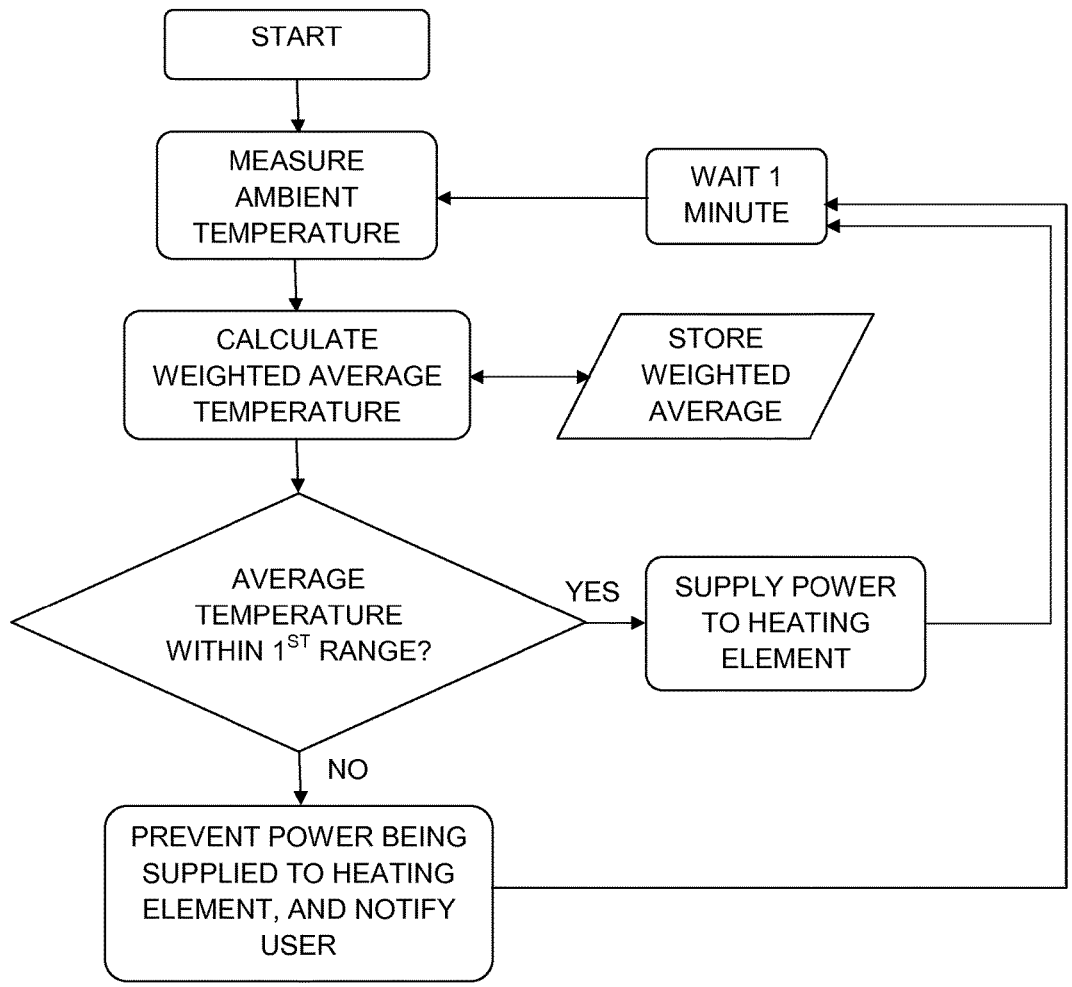
FIG. 6 shows a flow diagram of the control steps for discharging the electrically heated aerosol-generating device.

Finally, when the user initiates the aerosol-generating device to generate an aerosol, the method of FIG. 6 is carried out by the controller 128.

Again, the ambient temperature adjacent the device 102 is measured using temperature sensor 131, and a weighted average of the ambient temperature is calculated. The current temperature measurement is given a weighting of 10-50%, and the previous weighted average is given a weighting of 90-50%. Where the temperature measurement is the first temperature measurement, the weighted average is set to the current temperature.

The control electronics 128 then determine whether the weighted average temperature is within a range of operational temperatures. In one specific example, the operational range of temperatures is 12 degrees C. to 65 degrees C. If the weighted average temperature is within the range, the control electronics enables power to be supplied to the heating element 134.

If the weighted average temperature is not within the operational range of temperatures the control electronics 128 prevents power being supplied to the heating element 134.

After a period of 1 minute the process is repeated.

When the temperature is below the lower end of the operational temperature range, the resistance of the heating element will be too low for the battery 126 to supply sufficient current. The heating element in one specific example has a resistance of approximately 0.7 Ohm at 0 degrees C., and approximately 2 Ohm at 300 degrees C. (the temperature at which the heating element is held to generate an aerosol). The nominal voltage of the battery is 3.3 V at 0 degrees C., and during operation the nominal voltage of the battery at 300 degrees C. is 3.0 V. Therefore, at 0 degrees C., the current drain will be 3.3/0.7=4.7 A, but at 300 degrees C., the current drain will be 3.0/2=1.5.

When the temperature is above the higher end of the operational temperature range, the use of the aerosol-generating device may increase the temperature of the control electronics to above its upper design temperature of 80 degrees C., which could result in unreliable performance.

Briefly, when the control electronics 128 provide power to the heating element 134, the heating element 134 heats to approximately 300 degree C. The heating element 134 is in contact with the aerosol-generating substrate of the aerosol-generating article 104. This causes the aerosol-generating substrate to generate an aerosol which can be inhaled by the user when they draw on the aerosol-generating article 104.

The invention has been exemplified above by reference to the accompanying figures. However, it will be appreciated that the control methods described herein may be applicable to other types of portable device.

The invention claimed is:

1. A method of controlling an electrically heated aerosol-generating system, the electrically heated aerosol-generating system comprising a charging device comprising a first rechargeable power supply, an electrically heated aerosol-generating device configured to receive an aerosol-generating substrate and comprising a second rechargeable power supply, and at least one electrical heating element, the method comprising:
   monitoring an ambient temperature adjacent the charging device;
   determining a charging current, for charging the first rechargeable power supply of the charging device, in dependence on the ambient temperature; and
   charging the first rechargeable power supply of the charging device at the determined charging current, wherein:
   when the ambient temperature is within a first predetermined temperature range, the charging current is less than about 0.1 C,
   when the ambient temperature is within a second predetermined temperature range, the charging current is greater than about 0.1 C, and
   when the ambient temperature is above a predetermined temperature, preventing the charging of the first rechargeable power supply.

2. The method according to claim 1, further comprising, when the first rechargeable power supply of the charging device is being charged, indicating to a user what charging current is being provided to the first rechargeable power supply.

3. The method according to claim 1, further comprising:
   determining a discharging current for the first rechargeable power supply of the charging device, for charging the second rechargeable power supply of the electrically heated aerosol-generating device; and
   charging the second rechargeable power supply of the electrically heated aerosol-generating device at the determined discharging current, wherein:
   when the ambient temperature is within a third predetermined temperature range, the discharging current is between about 0.1 C and about 0.3 C,
   when the ambient temperature is within a fourth predetermined temperature range, the discharging current is between about 0.8 C and about 1.2 C, and
   when the ambient temperature is above a predetermined temperature, preventing the discharging of the first rechargeable power supply.

4. The method according to claim 3, further comprising, when the first rechargeable power supply of the charging device is being discharged, indicating to a user what discharging current is being provided to the second rechargeable power supply of the electrically heated aerosol-generating device.

5. The method according to claim 1, further comprising:
   monitoring the ambient temperature adjacent the electrically heated aerosol-generating device; and
   providing a charging current to the second rechargeable power supply of the electrically heated aerosol-generating device for recharging the second rechargeable power supply, in dependence on the ambient temperature, wherein:
   when the ambient temperature adjacent the electrically heated aerosol-generating device is within a predetermined temperature range, providing a charging current of about 10 C to the second rechargeable power supply, and
   when the ambient temperature adjacent the electrically heated aerosol-generating device is outside the predetermined temperature range, preventing the charging current from being supplied to the second rechargeable power supply.

6. The method according to claim 1, wherein the monitoring the ambient temperature is performed with a frequency of about once per minute to about 5 times per minute.

7. The method according to claim 6, wherein the determining the charging current is performed in dependence on a weighted average of the monitored ambient temperature.

8. A method of controlling an electrically heated aerosol-generating device configured to receive an aerosol-generating substrate, the device comprising a rechargeable power supply and at least one electrical heating element, the method comprising:

monitoring an ambient temperature adjacent the device; and providing power to the at least one electrical heating element from the rechargeable power supply in dependence on the ambient temperature adjacent the device, wherein:

when the ambient temperature adjacent the device is within a predetermined temperature range, providing the power to the at least one electrical heating element, and when the ambient temperature adjacent the device is outside the predetermined temperature range, preventing the power from being supplied to the at least one electrical heating element.

9. An electrically heated aerosol-generating system, comprising:

an electrically heated aerosol-generating device configured to receive an aerosol-generating substrate, the device comprising:
  a heating element, and
  a first rechargeable power supply configured to supply power to the heating element; and
a charging device configured to receive the electrically heated aerosol-generating device, the charging device comprising:
  a cavity configured to receive the electrically heated aerosol-generating device,
  a second rechargeable power supply configured to charge the first rechargeable power supply of the electrically heated aerosol-generating device,
  a temperature sensor configured to sense an ambient temperature adjacent the charging device, and
  a controller configured to control the supply of power to the second rechargeable power supply from an external power source to recharge the second rechargeable power supply, in dependence on the ambient temperature adjacent the charging device, wherein:
    when the ambient temperature adjacent the charging device is within a first predetermined range, the controller is configured to provide a charging current of less than about 0.1 C,
    when the ambient temperature adjacent the charging device is within a second predetermined range, the controller is configured to provide a charging current of greater than about 0.1 C, and
    when the ambient temperature adjacent the charging device is above a predetermined temperature, preventing the charging of the second rechargeable power supply.

10. The system according to claim 9, the charging device further comprising an indicator configured to indicate to a user what charging current is being provided to the second rechargeable power supply, when the second rechargeable power supply of the charging device is being charged.

11. The system according to claim 9,
wherein the charging device controller is further configured to control the supply of power from the second rechargeable power supply to the electrically heated aerosol-generating device to recharge the first rechargeable power supply, wherein:
  when the ambient temperature adjacent the charging device is within a third predetermined temperature range, the controller is further configured to provide a discharging current between about 0.1 C and about 0.3 C to the first rechargeable power supply of the electrically heated aerosol-generating device,
  when the ambient temperature adjacent the charging device is within a fourth predetermined temperature range, the controller is further configured to provide a discharging current between about 0.8 C and about 1.2 C to the first rechargeable power supply of the electrically heated aerosol-generating device, and
  when the ambient temperature adjacent the charging device is above a predetermined temperature, the controller is further configured to prevent discharging of the second rechargeable power supply.

12. The system according to claim 11, the charging device further comprising an indicator configured to indicate to a user what discharging current is being provided to the first rechargeable power supply of the electrically heated aerosol-generating device when the second rechargeable power supply of the charging device is being discharged.

13. The system according to claim 9, the electrically heated aerosol-generating device further comprising another temperature sensor configured to sense an ambient temperature adjacent the electrically heated aerosol-generating device,
wherein the charging device controller is further configured to control the supply of power from the second rechargeable power supply to the first rechargeable power supply to recharge the first rechargeable power supply in dependence on the ambient temperature adjacent the electrically heated aerosol-generating device, wherein:
  when the ambient temperature adjacent the electrically heated aerosol-generating device is within a predetermined temperature range, the controller is further configured to provide a charging current of about 10 C to the first rechargeable power supply, and
  when the ambient temperature adjacent the electrically heated aerosol-generating device is outside the predetermined temperature range, the controller is further configured to prevent the charging current from being supplied to the first rechargeable power supply.

14. An electrically heated aerosol-generating device configured to receive an aerosol-generating substrate, comprising:
  a heating element;
  a rechargeable power supply configured to supply power to the heating element;
  a temperature sensor configured to sense an ambient temperature adjacent the device; and
  a controller configured to control a supply of power from the rechargeable to the heating element in dependence on the ambient temperature adjacent the device, wherein:
    when the ambient temperature adjacent the device is within a predetermined temperature range, the controller is configured to supply power to the heating element, and
    when the ambient temperature adjacent the device is outside the predetermined temperature range, the controller is configured to prevent power from being supplied to the heating element.

15. The device according to claim 14, further comprising an indicator configured to indicate to a user when the ambient temperature adjacent the device is outside the predetermined temperature range.

* * * * *